US011747020B2

(12) United States Patent
Todd et al.

(10) Patent No.: US 11,747,020 B2
(45) Date of Patent: Sep. 5, 2023

(54) COOKTOP AND INSULATED BURNER ASSEMBLY

(71) Applicant: Haier US Appliance Solutions, Inc., Wilmington, DE (US)

(72) Inventors: Justin Patrick Todd, Louisville, KY (US); Yamil Tlapalama, Santiago de Querétaro (MX)

(73) Assignee: Haier US Appliance Solutions, Inc., Wilmington, DE (US)

( * ) Notice: Subject to any disclaimer, the term of this patent is extended or adjusted under 35 U.S.C. 154(b) by 45 days.

(21) Appl. No.: 17/399,719

(22) Filed: Aug. 11, 2021

(65) Prior Publication Data

US 2023/0051774 A1   Feb. 16, 2023

(51) Int. Cl.
*F24C 3/08* (2006.01)
*F24C 15/34* (2006.01)
*F16L 59/18* (2006.01)
*F23D 14/06* (2006.01)

(52) U.S. Cl.
CPC .............. *F24C 3/085* (2013.01); *F16L 59/18* (2013.01); *F23D 14/06* (2013.01); *F24C 15/34* (2013.01); *F23D 2211/00* (2013.01)

(58) Field of Classification Search
CPC .......... F16L 59/18; F23D 14/06; F24C 15/34; F24C 3/085

USPC .............................................. 126/39 E, 39 R
See application file for complete search history.

(56) References Cited

U.S. PATENT DOCUMENTS

| | | | |
|---|---|---|---|
| 4,354,478 A | * | 10/1982 | Contini ................... F24C 3/085 126/40 |
| 8,997,731 B2 | | 4/2015 | Arrigoni |
| 10,465,913 B2 | | 11/2019 | Bink |
| 2019/0107287 A1 | * | 4/2019 | Kitabayashi ............ F24C 3/085 |

FOREIGN PATENT DOCUMENTS

| | | |
|---|---|---|
| CN | 206959017 U | 2/2018 |
| CN | 207094617 U | 3/2018 |
| JP | 2016200375 A | 12/2016 |
| KR | 101946722 B1 | 2/2019 |

* cited by examiner

*Primary Examiner* — Vivek K Shirsat
(74) *Attorney, Agent, or Firm* — Dority & Manning, P.A.

(57) ABSTRACT

A cooktop appliance may include a top panel and a gas burner. The top panel may define an opening. The gas burner may include a burner body, a fuel tube, an injet bracket, and an insulator pad. The burner body may be positioned on the top panel at the opening. The fuel tube may extend below the burner body in upstream fluid communication therewith. The injet bracket may be mounted below the burner body. The injet bracket may define a fuel orifice disposed upstream from the fuel tube and below the top panel. The insulator pad may be disposed between the burner body and the injet bracket to restrict heat transfer therebetween.

17 Claims, 5 Drawing Sheets

COOKTOP AND INSULATED BURNER ASSEMBLY

FIELD OF THE INVENTION

The present subject matter relates generally to cooktop appliances with gas burners.

BACKGROUND OF THE INVENTION

Certain cooktop appliances include gas burners for heating pots, pans, griddles, etc. Typically, such gas burners are mounted on a cooktop panel, which supports the gas burners. In order to supply fuel, one or more fuel lines connect to each gas burner, such as with one or more connector nuts or gas fittings. For instance, gas fittings may secure the fuel lines below the cooktop panel or the gas burner in general.

One of the common problems with a gas burner assembly is managing heat generated as the gas burner operates (i.e., burns fuel). Although flames are directed upward, at least a portion of the heat is transmitted (e.g., via conductive or convective heat transfer) from the gas burner (e.g., downward). In many instances, it is possible for large temperature increases to occur across the lower portions of the gas burner, such as below the cooktop panel. This is especially true during high-heat operations. It is plausible that significant amounts of heat may be transmitted to the fuel lines or gas fittings, which may cause annealing and expansion. In some cases, it is possible that connector nuts or gas fittings may become loose, undermining the connection between the corresponding fuel line and gas burner.

As a result, a cooktop appliance or gas burner assembly having one or more features for addressing heat transferred from the gas burner assembly would be useful. In particular, it may be advantages to provide a cooktop appliance that mitigates or prevents significant heat from being transmitted to a fuel line or gas fitting (e.g., to prevent expansion or annealing that might loosen the connection between the corresponding fuel line and gas burner).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooktop appliance is provided. The cooktop appliance may include a top panel and a gas burner. The top panel may define an opening. The gas burner may include a burner body, a fuel tube, an injet bracket, and an insulator pad. The burner body may be positioned on the top panel at the opening. The fuel tube may extend below the burner body in upstream fluid communication therewith. The injet bracket may be mounted below the burner body. The injet bracket may define a fuel orifice disposed upstream from the fuel tube and below the top panel. The insulator pad may be disposed between the burner body and the injet bracket to restrict heat transfer therebetween.

In another exemplary aspect of the present disclosure, a cooktop appliance is provided. The cooktop appliance may include a top panel and a gas burner. The top panel may define an opening. The gas burner may include a burner body, a primary fuel tube, a secondary fuel tube, an injet bracket, an insulator pad, a primary gas line, and a secondary gas line. The burner body may be positioned on the top panel at the opening. The primary fuel tube may extend below the burner body in upstream fluid communication therewith. The secondary fuel tube may extend below the burner body in upstream fluid communication therewith apart from the primary fuel tube. The injet bracket may be mounted below the burner body. The injet bracket may define a first fuel orifice disposed upstream from the primary fuel tube. The injet bracket may further define a second fuel orifice disposed upstream from the secondary fuel tube. The insulator pad may be disposed between the burner body and the injet bracket to restrict heat transfer therebetween. The primary gas line may extend to the injet bracket upstream from the first fuel orifice. The secondary gas line may extend to the injet bracket upstream from the second fuel orifice.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure relates generally to a gas burner 300 for a cooktop appliance 100. Although cooktop appliance 100 is used below for the purpose of explaining the details of the present subject matter, it will be appreciated that the present subject matter may be used in or with any other suitable appliance in alternative exemplary embodiments. For example, the gas burner 300 described below may be used on other types of cooktop appliances, such as single or double oven range appliances. Cooktop appliance 100 is used in the discussion below only for the purpose of explanation, and such use is not intended to limit the scope of the present disclosure to any particular style of appliance.

Figure 1:
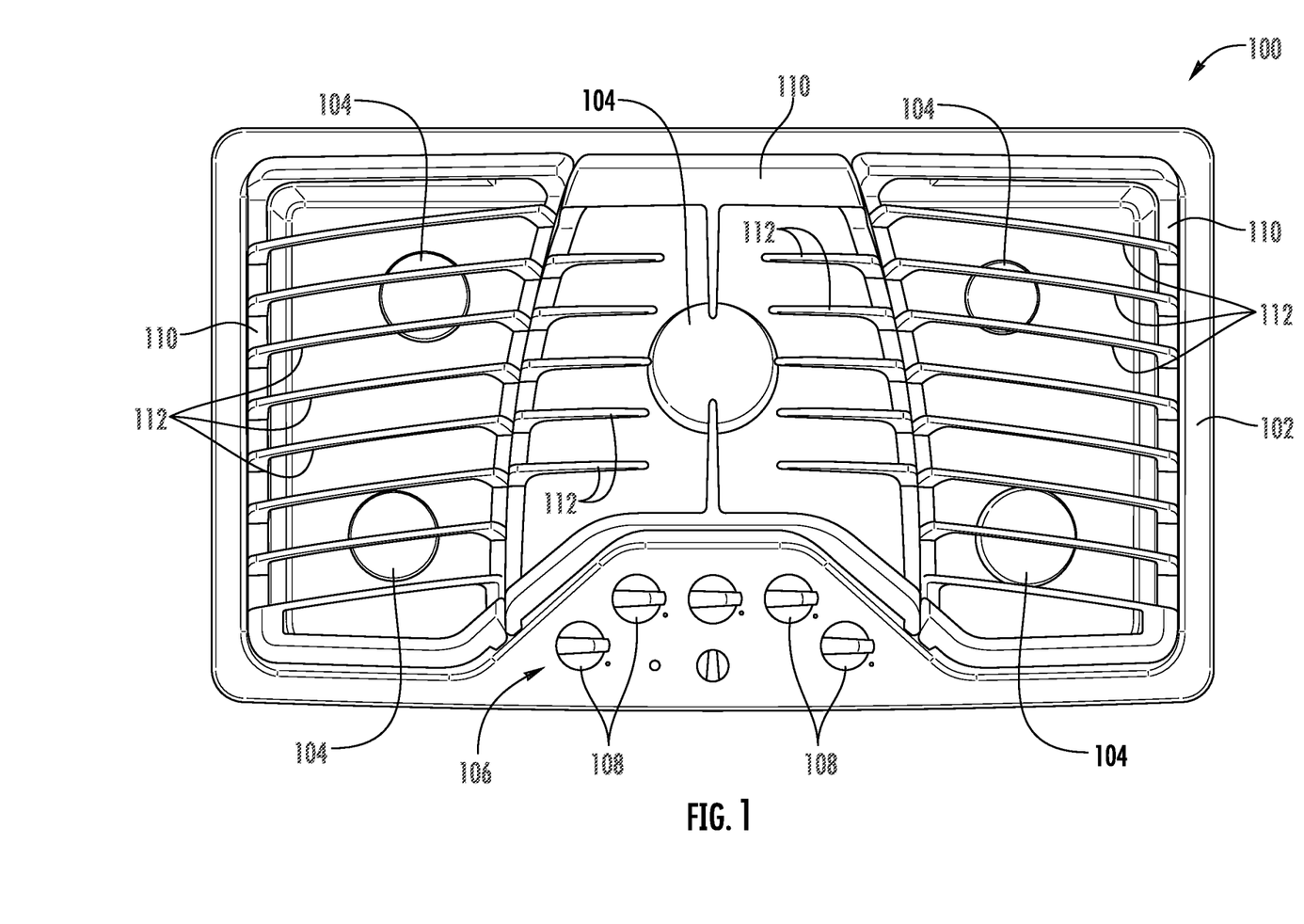
FIG. 1 provides a top plan view of a cooktop appliance according to an exemplary embodiment of the present disclosure.

FIG. 1 illustrates an exemplary embodiment of a cooktop appliance 100 of the present disclosure. Cooktop appliance 100 may be, e.g., fitted integrally with a surface of a kitchen counter or may be configured as a slide-in cooktop unit. Cooktop appliance 100 includes a top panel 102 that includes one or more heating sources, such as gas burners 104 for use in, e.g., heating or cooking. In general, top panel 102 may be constructed of any suitably rigid material capable of supporting gas burners 104, cooking utensils, grates 110, or other components of cooktop appliance 100. By way of example, top panel 102 may be constructed of enameled steel, stainless steel, glass, ceramics, and combinations thereof.

According to the illustrated exemplary embodiment, a user interface panel or control panel 106 is located within convenient reach of a user of cooktop appliance 100. For this exemplary embodiment, control panel 106 includes control knobs 108 that are each associated with one of gas burners 104. Control knobs 108 allow the user to activate each gas burner 104 and regulate the amount of heat input each gas burner 104 provides to a cooking utensil located thereon, as described in more detail below. Although cooktop appliance 100 is illustrated as including control knobs 108 for controlling gas burners 104, it will be understood that control knobs 108 and the configuration of cooktop appliance 100 shown in FIG. 1 is provided by way of example only. More specifically, control panel 106 may include various input components, such as one or more of a variety of touch-type controls, electrical, mechanical or electro-mechanical input devices including rotary dials, push buttons, and touch pads.

Cooktop appliance 100 is generally referred to as a "gas cooktop." For example, one or more of the gas burners 104 in cooktop appliance may be a gas burner 300 described below. As illustrated, gas burners 104 are positioned on or within top panel 102 and have various sizes, as shown in FIG. 1, so as to provide for the receipt of cooking utensils (i.e., pots, pans, etc.) of various sizes and configurations and to provide different heat inputs for such cooking utensils. In addition, cooktop appliance 100 may include one or more grates 110 configured to support a cooking utensil, such as a pot, pan, etc. In general, grates 110 include a plurality of elongated members 112, e.g., formed of cast metal, such as cast iron. The cooking utensil may be placed on the elongated members 112 of each grate 110 such that the cooking utensil rests on an upper surface of elongated members 112 during the cooking process. Gas burners 104 are positioned underneath the various grates 110 such that gas burners 104 provide thermal energy to cooking utensils above top panel 102 by combustion of fuel below the cooking utensils.

Figure 2:
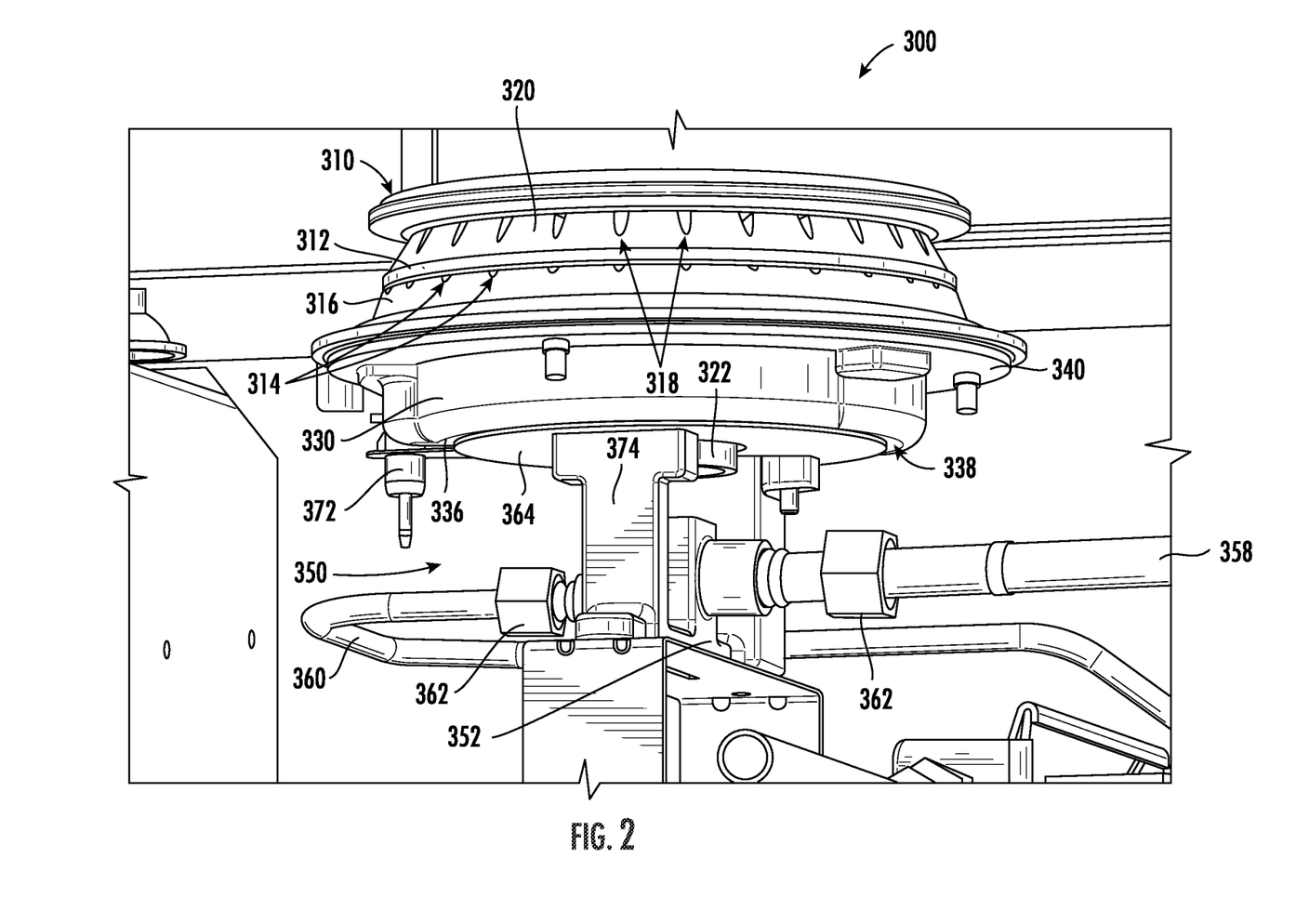
FIG. 2 provides a bottom perspective view of a gas burner according to exemplary embodiments of the present disclosure.
Figure 3:
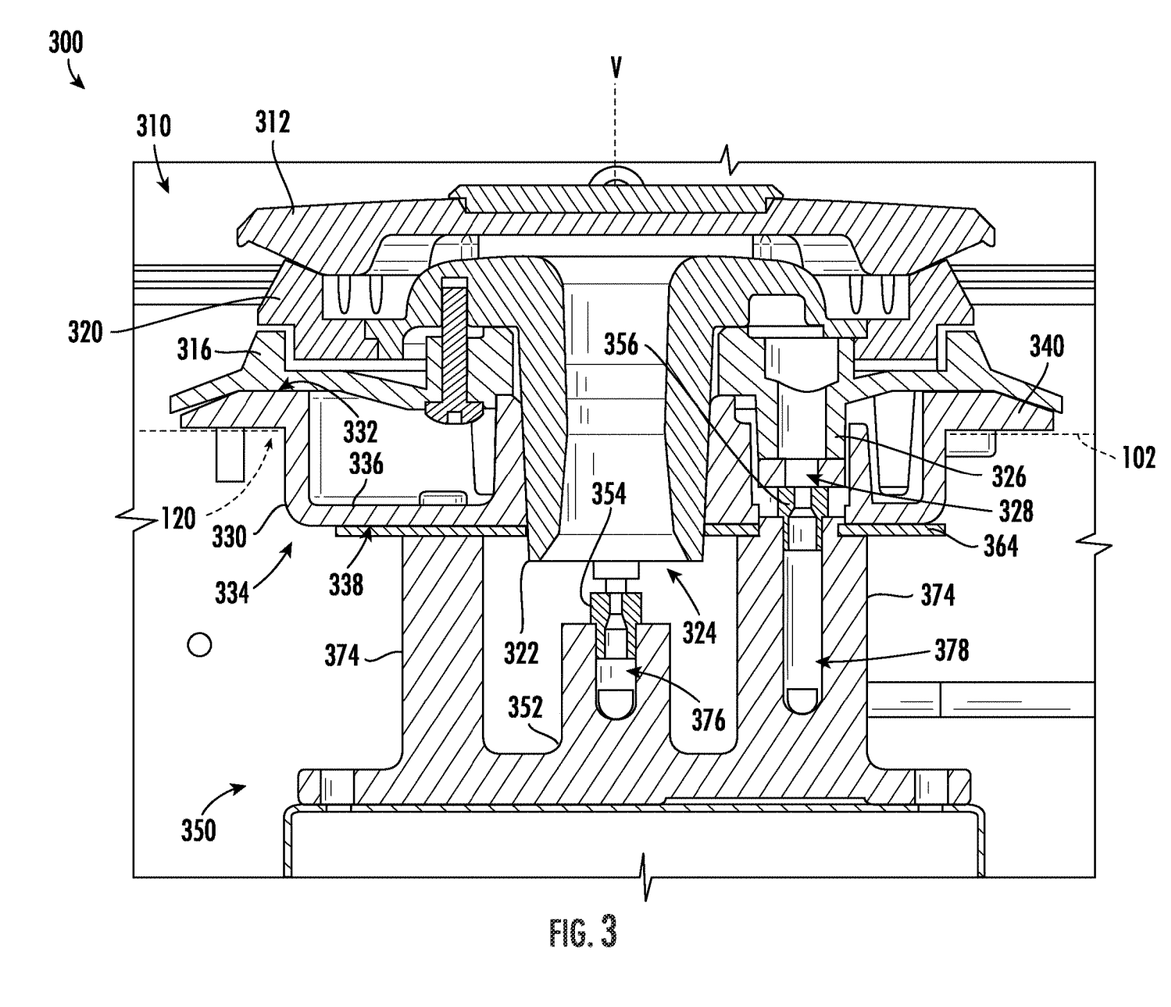
FIG. 3 provides a section view of the exemplary gas burner of FIG. 2.
Figure 4:
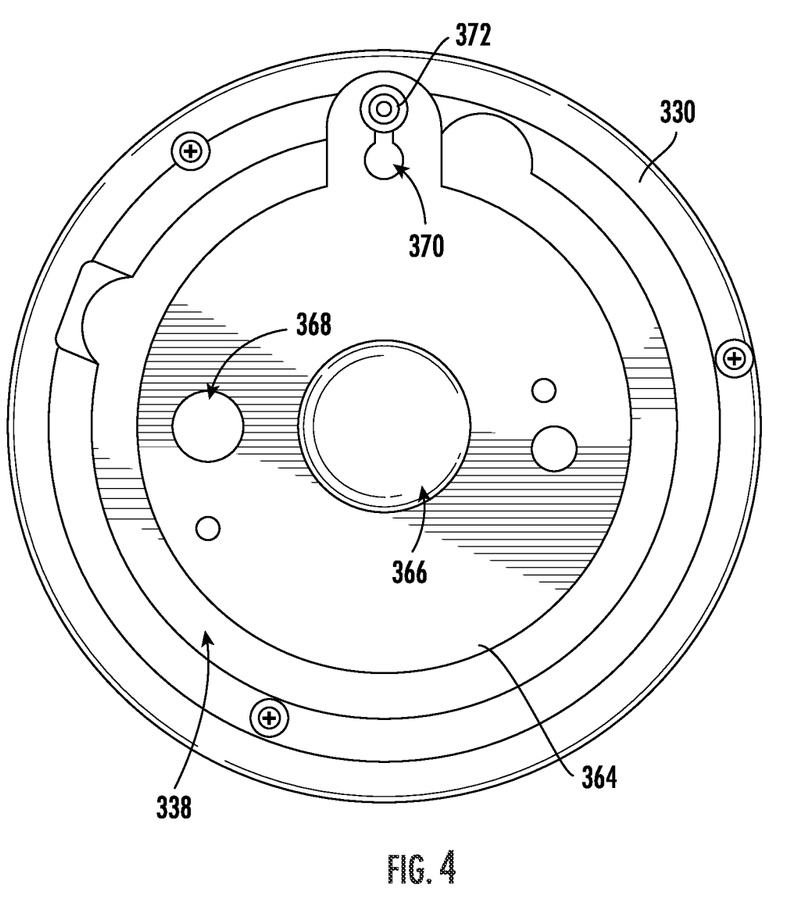
FIG. 4 provides a bottom plan view of a burner body and insulator pad of the exemplary gas burner of FIG. 2.
Figure 5:
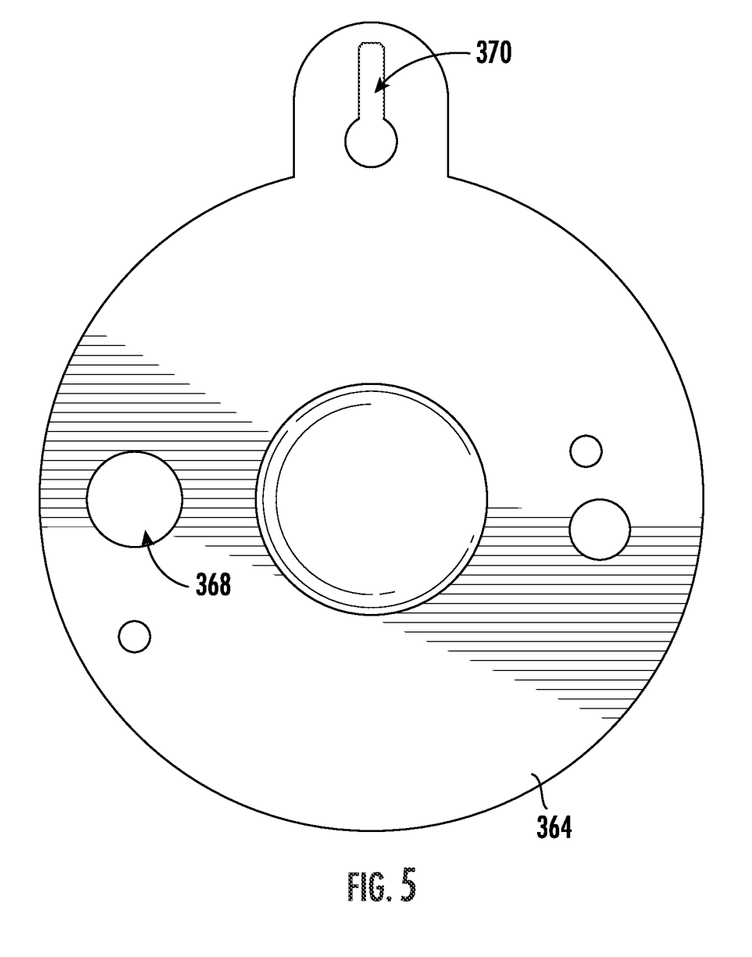
FIG. 5 provides a bottom plan view of the insulator pad of the exemplary gas burner of FIG. 2.

Turning especially to FIGS. 2 and 3, a gas burner 300 according to an exemplary embodiment of the present disclosure is described. Gas burner 300 may be used in cooktop appliance 100, e.g., as one of gas burners 104. Thus, gas burner 300 is described in greater detail below in the context of cooktop appliance 100. However, it will be understood that gas burner 300 may be used in or with any other suitable cooktop appliance in alternative exemplary embodiments.

Gas burner 300 includes a burner body 310 positioned at an opening 120 defined through top panel 102. Generally, burner body 310 defines a plurality of flame ports above top panel 102. For instance, burner body 310 may include a burner head 312 defining one or more discrete flame port sets (e.g., wherein each flame port set includes a plurality of circumferentially spaced flame ports). In some embodiments, one (e.g., first or lower) discrete flame port set (i.e., first flame ports 314) is defined at a first or lower plate 316. The first or lower plate 316 may have a ring-shaped or round profile. In turn, first flame ports 314 may be distributed in a ring. In additional or alternative embodiments, one (e.g., second or upper) discrete flame port set (i.e., second flame ports 318) is defined at a second or upper plate 320. The second or upper plate 320 may have a ring-shaped or round profile. As shown, burner body 310 may be stacked (e.g., such that second plate is supported on first plate). Second flame ports 318 may be positioned above first flame ports 314. Moreover, burner body 310 may be positioned on top panel 102.

In certain embodiments, a primary fuel tube 322 extends below the burner body 310. For instance, primary fuel tube 322 may extend (e.g., downward) from upper plate 320. Primary fuel tube 322 may extend through top panel 102 and define a passage having a primary fuel inlet 324 through which gaseous fuel may be received. As shown, the passage (or primary fuel tube 322 generally) may extend along or parallel to the vertical direction V. In the illustrated embodiments, primary fuel tube 322 is a Venturi mixing tube. Air and gaseous fuel may mix within vertical primary fuel tube 322 prior to flowing to the upper flame ports 318 where the mixture of air and gaseous fuel may be combusted.

In additional or alternative embodiments, a secondary fuel tube 326 extends below the burner body 310 (e.g., apart from the primary fuel tube 322). For instance, secondary fuel tube 326 may extend (e.g., downward) from lower plate 316. Primary fuel tube 322 may extend through top panel 102 and define a passage having a secondary fuel inlet 328 through which gaseous fuel may be received. The secondary fuel tube 326 and secondary fuel inlet 328 may be disposed radially outward from the primary fuel tube 322 or otherwise radially outward from a central axis of burner head 312. As shown, the passage (or secondary fuel tube 326 generally) may extend along or parallel to the vertical direction V. Gaseous fuel flow through secondary fuel tube 326 prior to flowing to the lower flame ports 314 where the gaseous fuel may be combusted.

As shown, a burner base 330 is provided with gas burner 300. Generally, burner base 330 extends from a top base end 332 to a bottom base end 334. Burner base 330 may include or be formed as a recessed pan that sits within the central opening 120 of top panel 102. At the bottom base end 334, the recessed pan may include a lower base wall 336 that defines an outer bottom surface 338 facing away from burner head 312 (e.g., downward) and extending along bottom base end 334 (e.g., perpendicular to the vertical direction V). When assembled, at least a portion of burner base 330 is disposed below (e.g., at a lower height relative to the vertical direction V than) top panel 102. Specifically, lower base wall 336 may be held below top panel 102. Primary fuel tube 322 may extend through lower base wall 336 and therebelow (e.g., through a central aperture defined by the lower base wall 336). Optionally, a base rim 340 may extend radially outward (e.g., from recessed pan) at top base end 332. In some such embodiments, burner head 312 rests on base rim 340. For instance, lower plate 316 may be supported on top of base rim 340. In turn, burner base 330 may support one or both fuel tubes 322, 326 (e.g., directly or indirectly).

In some embodiments, gas burner 300 includes an injet assembly 350. Injet assembly 350 may be positioned below top panel 102 (e.g., below the corresponding opening 120 of top panel 102). Conversely, burner body 310 may be positioned on top panel 102 (e.g., over opening 120 of top panel 102). Thus, burner body 310 may cover opening 120 of top panel 102 when burner body 310 is positioned on top panel 102. When burner body 310 is removed from top panel 102, injet assembly 350 below top panel 102 may be accessible through opening 120. Thus, for example, one or more fuel orifices of gas burner 300 on injet assembly 350 may be accessed by removing burner body 310 and burner base 330 from top panel 102, and an installer may reach through opening 120 (e.g., with a wrench or other suitable tool) to change out the fuel orifice(s) of gas burner 300.

Injet assembly 350 is generally configured for directing a flow of gaseous fuel to the flame ports of burner body 310 (e.g., to lower flame ports 314 or upper flame ports 318) from an upstream gaseous fuel source. As shown, injet assembly 350 may include an injet bracket 352 including or defining one or more fuel orifices.

In some embodiments, one (e.g., first) fuel orifice 354 on injet bracket 352 is provided in fluid communication with a first internal gas passage 376. First fuel orifice 354 may be mounted below and vertically spaced apart from the primary fuel tube 322. Moreover, first fuel orifice 354 may be mounted upstream of primary fuel tube 322. Optionally, first fuel orifice 354 may be vertically aligned with primary fuel tube 322. Additionally or alternatively, first fuel orifice 354 may be disposed below top panel 102. During use, a jet of gaseous fuel from the gaseous fuel source may exit injet assembly 350 at first fuel orifice 354 and flow towards primary fuel tube 322. Between first fuel orifice 354 and primary fuel tube 322, the jet of gaseous fuel from first fuel orifice 354 may entrain air into vertical primary fuel tube 322. Air and gaseous fuel may mix within vertical primary fuel tube 322 prior to flowing to upper flame ports 318 where the mixture of air and gaseous fuel may be combusted.

As shown, a primary gas line 358 may extend to the injet bracket 352 upstream from the fuel orifice 354 (e.g., from the fuel source). For instance, the primary gas line 358 may be disposed below the top panel 102 to connect to the injet bracket 352 in fluid communication with the first internal gas passage 376. One or more mechanical couplings may connect the injet bracket 352 to the primary gas line 358. In the illustrated embodiments, a mechanical coupling in the form of a threaded gas fitting 362 holds the primary gas line 358 to the injet bracket 352.

In additional or alternative embodiments, one (e.g., second) fuel orifice 356 on injet bracket 352 is provided in fluid communication with a second internal gas passage 378 (e.g., spaced apart and in fluid isolation from first internal gas passage). Second fuel orifice 356 may be mounted below the secondary fuel tube 326. Moreover, second fuel orifice 356 may be mounted upstream of secondary fuel tube 326. Optionally, second fuel orifice 356 may be vertically aligned with secondary fuel tube 326. Additionally or alternatively, second fuel orifice 356 may be disposed within the burner body 310. For instance, at least a portion of injet bracket 352 may extend through top panel 102 to be received within lower plate 316. During use, a jet of gaseous fuel from the gaseous fuel source may exit injet assembly 350 at second fuel orifice 356 and flow towards secondary fuel tube 326. Between second fuel orifice 356 and secondary fuel tube 326, the jet of gaseous fuel from second fuel orifice 356 may enter vertical secondary fuel tube 206 before being combusted (e.g., at lower flame ports 314).

As shown, a secondary gas line 360 may extend to the injet bracket 352 upstream from the fuel orifice 356 (e.g., from the fuel source and in fluid parallel with the primary gas line 358). For instance, the secondary gas line 360 may be disposed below the top panel 102 to connect to the injet bracket 352 in fluid communication with the second internal gas passage 378. One or more mechanical couplings may connect the injet bracket 352 to the secondary gas line 360. In the illustrated embodiments, a mechanical coupling in the form a threaded gas fitting 362 holds the secondary gas line 360 to the injet bracket 352.

Optionally, one or more legs 374 may extend upwardly from injet bracket 352 to burner base 330, and mechanical fasteners may extend through burner base 330 (e.g., at lower base wall 336) into legs 374 to mount injet assembly 350 (e.g., directly or indirectly) to top panel 102.

Turning now generally to FIGS. 2 through 5, in certain embodiments, an insulator pad 364 is disposed between the burner body 310 and the injet bracket 352. Generally, insulator pad 364 extends as a mat or sheet placed on burner base 330. For instance, insulator pad 364 may be disposed on (e.g., directly on) the bottom surface 338. In certain embodiments, insulator pad 364 is held in friction fit engagement between the burner body 310 (e.g., at burner base 330) and the injet bracket 352. As shown, the insulator pad 364 may be sandwiched between the bottom surface 338 of burner base 330 and an upper portion of injet bracket 352 (e.g., at the legs 374). Optionally, the clamping force of the mechanical fasteners holding injet bracket 352 or legs 374 to burner base 330 may also hold insulator pad 364 between burner base 330 and injet bracket 352.

Insulator pad 364 may generally limit or prevent direct contact between injet assembly 350 and burner body 310. For instance, insulator pad 364 may extend across the entirety or majority (e.g., majority of the surface area) of the bottom surface 338 of burner base 330. Alternatively, insulator pad 364 may be substantially limited to the footprint of the legs 374 on burner base 330. In some embodiments, insulator pad 364 defines one or more apertures to permit receipt of one or more elements through burner base 330. As an example, one or more tube apertures may be defined (e.g., vertically) through insulator pad 364 to permit a fuel tube (or passage upstream thereof) to extend through insulator pad 364. In some such embodiments, insulator pad 364 is disposed about primary fuel tube 322, which may extend through a first tube aperture 366. In additional or alternative embodiments, insulator pad 364 is disposed about second fuel orifice 356, which may be coaxially aligned with or extend through a second tube aperture 368.

As shown, a mounting aperture 370 may be defined (e.g., vertically) through insulator pad 364. When assembled, an igniter 372 of gas burner 300 may be held within mounting aperture 370. Advantageously, igniter 372 may be joined to burner base 330 through insulator pad 364, thereby ensuring proper orientation of insulator pad 364 on burner base 330 (e.g., during installation even if insulator is initially produced for multiple differing sizes of burners) without requiring an adhesive joining the insulator pad 364 to the burner base 330 or injet assembly 350.

Insulator pad 364 may be formed from or include any suitable heat-insulating material. For instance, insulator pad 364 may include one or more fiberglass sheets (e.g., formed from an insulating paper of glass fibers, glass microfibers, and inorganic filler material, as would be understood). Optionally, multiple sheets or layers may be joined together as a multi-ply pad (e.g., joined by a polyimide silicone adhesive). Together, insulator pad 364 may define a vertical height or thickness that is between 0.05 millimeters and 2 millimeters. Additionally or alternatively, insulator pad 364 may define a vertical height or thickness that is less than 1 millimeter.

Advantageously, gas burner(s) (e.g., 300) in accordance with the present disclosure may limit heat transfer (e.g., conductive heat transfer) from burner head 310 to a lower portion of the burner 300. In some such embodiments, heat is notably prevented from being conducted to one or more gas lines 358 or 360, which might otherwise cause warping, expansion, or annealing (e.g., at fittings 362).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance comprising:
   a top panel defining an opening; and
   a gas burner comprising
   a burner body positioned on the top panel at the opening,
   a fuel tube extending below the burner body in upstream fluid communication therewith,
   an injet bracket mounted below the burner body, the injet bracket defining a fuel orifice disposed upstream from the fuel tube and below the top panel, and
   an insulator pad disposed between the burner body and the injet bracket to restrict heat transfer therebetween, wherein the burner body comprises a burner head and a burner base, the burner base being disposed beneath the top panel in support of the fuel tube, and wherein the insulator pad is disposed against a bottom surface of the burner base.

2. The cooktop appliance of claim 1, wherein the insulator pad is held in friction fit engagement between the burner body and the injet bracket.

3. The cooktop appliance of claim 1, wherein the insulator pad is disposed about the fuel tube.

4. The cooktop appliance of claim 1, further comprising a gas line extending to the injet bracket upstream from the fuel orifice.

5. The cooktop appliance of claim 4, further comprising a threaded gas fitting holding the gas line to the injet bracket.

6. The cooktop appliance of claim 1, wherein the burner head defines a plurality of flame ports above the top panel and downstream from the fuel tube.

7. The cooktop appliance of claim 1, wherein the gas burner further defines a secondary fuel inlet radially outward from the fuel tube, wherein the fuel orifice is a first fuel orifice, and wherein the injet bracket defines a second fuel orifice disposed upstream from the secondary fuel inlet apart from the first fuel orifice.

8. The cooktop appliance of claim 7, wherein the second fuel orifice is disposed within the burner body.

9. The cooktop appliance of claim 7, wherein the insulator pad is disposed about the second fuel orifice.

10. A cooktop appliance comprising:
    a top panel defining an opening; and
    a gas burner comprising
    a burner body positioned on the top panel at the opening,
    a primary fuel tube extending below the burner body in upstream fluid communication therewith,
    a secondary fuel tube extending below the burner body in upstream fluid communication therewith apart from the primary fuel tube,
    an injet bracket mounted below the burner body, the injet bracket defining a first fuel orifice disposed upstream from the primary fuel tube, the injet bracket further defining a second fuel orifice disposed upstream from the secondary fuel tube,
    an insulator pad disposed between the burner body and the injet bracket to restrict heat transfer therebetween,
    a primary gas line extending to the injet bracket upstream from the first fuel orifice, and
    a secondary gas line extending to the injet bracket upstream from the second fuel orifice.

11. The cooktop appliance of claim 10, wherein the insulator pad is held in friction fit engagement between the burner body and the injet bracket.

12. The cooktop appliance of claim 10, wherein the insulator pad is disposed about the primary fuel tube.

13. The cooktop appliance of claim 12, further comprising a threaded gas fitting holding the primary gas line to the injet bracket.

14. The cooktop appliance of claim 10, wherein the burner body comprises a burner head and a burner base, the burner head defining a plurality of flame ports above the top panel and downstream from the primary fuel tube, the burner base being disposed beneath the top panel in support of the primary fuel tube.

15. The cooktop appliance of claim 14, wherein the insulator pad is disposed against a bottom surface of the burner base.

16. The cooktop appliance of claim 10, wherein the second fuel orifice is disposed within the burner body.

17. The cooktop appliance of claim 10, wherein the insulator pad is disposed about the second fuel orifice.

* * * * *